(12) United States Patent
Sharma (10) Patent No.: US 6,437,280 B1
(45) Date of Patent: Aug. 20, 2002

(54) PRINTER HAMMER TIP AND METHOD FOR MAKING

(75) Inventor: Rohit Sharma, Cypress, CA (US)

(73) Assignee: Printronix, Inc., Irvine, CA (US)

(*) Notice: Subject to any disclaimer, the term of this patent is extended or adjusted under 35 U.S.C. 154(b) by 82 days.

(21) Appl. No.: 09/661,675

(22) Filed: Sep. 14, 2000

Related U.S. Application Data (60) Provisional application No. 60/168,874, filed on Dec. 3, 1999.

(51) Int. Cl.$^7$ .......................... B23K 11/00; B23K 11/16; B23H 9/00
(52) U.S. Cl. ............................... 219/117.1; 219/69.17; 219/118
(58) Field of Search ................................ 219/91.2, 118, 219/117.1, 69.17; 101/93.48; 400/124.11

(56) References Cited

U.S. PATENT DOCUMENTS

| | | | |
|---|---|---|---|
| 3,573,690 A | * | 4/1971 | Jones et al. |
| 4,078,988 A | * | 3/1978 | Brandmair et al. |
| 4,304,495 A | * | 12/1981 | Wada et al. |
| 4,503,768 A | * | 3/1985 | Whitaker |
| 4,524,259 A | * | 6/1985 | Wolf et al. |
| 5,125,558 A | | 6/1992 | Jones et al |
| 5,335,999 A | * | 8/1994 | Farb et al. |
| 5,344,242 A | * | 9/1994 | Farb |
| 5,361,693 A | * | 11/1994 | Farb et al. |
| 5,711,622 A | | 1/1998 | Bringhurst et al. |
| 6,146,033 A | * | 11/2000 | Chang et al. |
| 6,244,768 B1 | * | 6/2001 | Chang et al. |

FOREIGN PATENT DOCUMENTS

| FR | 2517596 A | * | 6/1983 |
|---|---|---|---|
| JP | 0209587 A | * | 4/1990 |

* cited by examiner

*Primary Examiner*—M. Alexandra Elve
*Assistant Examiner*—Kiley Stoner
(74) *Attorney, Agent, or Firm*—George F. Bethel (57) ABSTRACT

A method of forming a printer tip on a metal printer hammer spring by providing a printer tip from a range of materials from the group consisting of sintered tungsten carbide, cemented tungsten carbide, composite ceramics, metallic materials, noble metals, metal carbides, borides, nitrides and alloys and mixtures thereof. The printer tip is pressed against the hammerspring while electrically softening the printer hammerspring through a voltage established by an electrode contacting the printer tip. A plating or coating of the printer tip beforehand can be undertaken with a conductive metallic material disposed on the surface of the printer tip. The printer tip is fused to the hammerspring and a milling of a desired form to the printer tip and hammerspring by an electrode discharge milling process can take place thereafter.

22 Claims, 6 Drawing Sheets

PRINTER HAMMER TIP AND METHOD FOR MAKING

This application claims the benefit of U.S. Provisional Application Serial No. 60/168,874, filed Dec. 3, 1999, entitled a Printer Hammer Tip and Method for Making, Inventor Rohit Sharma.

BACKGROUND OF THE INVENTION

1. Field of the Invention

The field of this invention lies within the printer art and the manufacture of printers. It lies to the extent of utilization within the printer art relying upon print hammers having tips. The print hammers are released against a ribbon and underlying media to be printed upon. The tips of the hammers are made of a hardened material and can be attached or formed on the hammers for continuous long wearing printing. More specifically, this invention relates to the print hammer's tips being formed of a hardened material that is fused to the magnetic steel of the print hammers in a consistent and long wearing manner.

2. Prior Art

Figure 3:
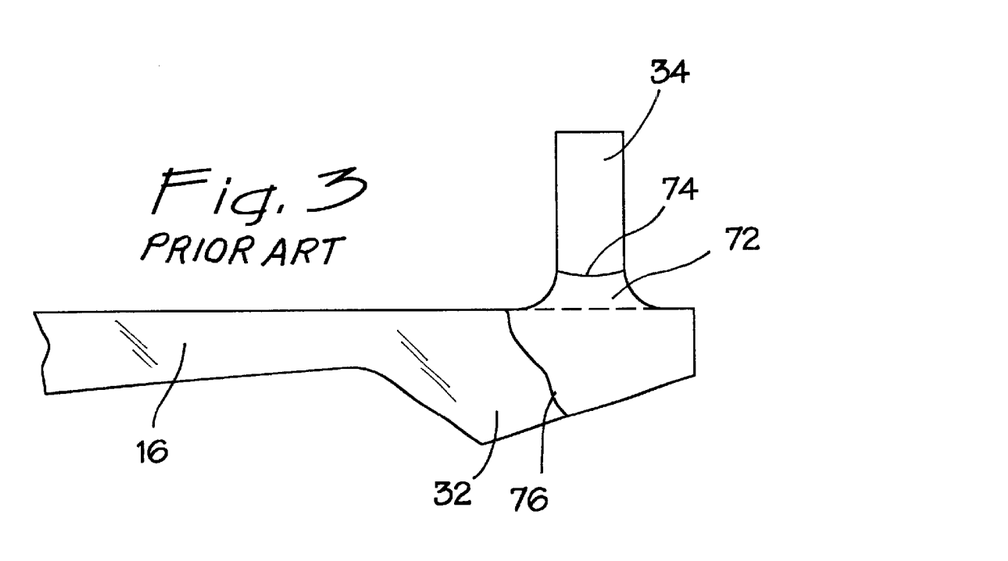
FIG. 3 is a fragmented side elevation view of prior art fusion and welding processes for forming a tip on a hammerspring.
Figure 4:
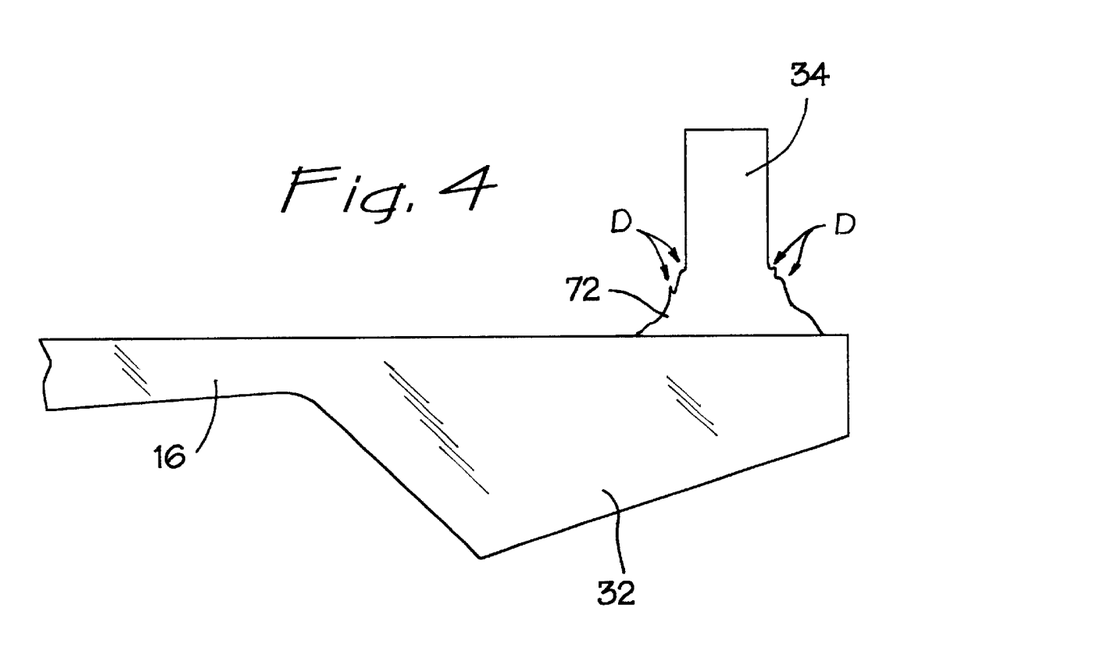
FIG. 4 shows a view of the prior art with certain areas of deformation that have not been well formed in the fillet by a welding process of a tip to a hammerspring.

Various printer tip designs and configurations have been known in the art. Some of these tip configurations can be seen in FIGS. 3 and 4. The foregoing printer tip configurations shown in FIGS. 3 and 4 are welded or fused to a print hammer.

During the process of welding a tip it is connected to an upper electrode and placed in contact with the magnetic steel forming the spring element or hammer element underlying the tip. Electrodes contacting the two respective elements, namely the tip and the hammerspring, are provided with a current, and welding takes place.

In the foregoing scenario, both the tip which can be formed of a cemented tungsten carbide having a matrix including cobalt binder and the magnetic steel are melted. During the melting process, the cemented tungsten carbide not only melts, but can become deformed as shown in FIG. 4.

Deformation of a pin or the print tip creates a situation wherein stress can build up at the fillet or angular melt point interfacing the hammerspring and the tip. As can be understood this creates a prospective situation where failure can occur.

In the alternative, if the pin material correctly melts and deforms at the right temperature, then an improved fillet is provided as shown in FIG. 3. On the other hand, if the temperature is not correct, and other conditions are not met with regard to the variances in the cemented tungsten carbide forming the tip, lines of deformation D and deformation areas as shown in FIG. 4 occur. These as previously stated become stress areas and are prone to fatigue failures.

Some of the foregoing is based upon the cobalt content in the cemented tungsten carbide. When different amounts of cobalt are in the tip either due to changes in quality control or other process changes, variable results can occur. Further to this extent, when the deformation lines D as in FIG. 4 are created, a degree of ink migration can take place.

Cemented tungsten carbide typically can have 2% or up to 22% of cobalt. The Condensed Chemical Dictionary Defines cemented tungsten carbide as a mixture consisting of tungsten carbide of eighty five to 95% and cobalt 5 to 15%, it can vary even to further ranges. In the prior art, the cemented tungsten carbide printer tips generally contain 16% cobalt and 84% tungsten carbide to facilitate melting. With the new process of this invention, the cobalt can be decreased significantly because of the fact the fusing, brazing, or connecting process does not require a melting of the cobalt to fuse with the underlying steel of the hammer.

Fundamentally, in prior processes where cemented tungsten carbide is utilized, it must fuse to other metals. This requires a higher percentage of cobalt in the way of a binder to reduce the melting temperature of the cemented tungsten carbide. The net result is to decrease the life of the tip because the cobalt causes softening of the cemented tungsten carbide material.

This invention overcomes the requirement of significant amounts of cobalt in the matrix of the cemented tungsten carbide. A further feature is that by lowering the amount of cobalt in the cemented tungsten carbide, a significantly longer wear life is incurred by the tip.

Another improvement is that by having an increased amount of tungsten carbide, the overall tip maintains a significant degree of formation in its original state rather than being deformed.

Another feature of this invention is that the temperature ranges can be maintained below the melting temperature of the cobalt or melting temperature of the cemented tungsten carbide material.

Another improvement of this invention is that materials can be selected from the family of tungsten, sintered tungsten carbide, alloys of tungsten, composite ceramics, metallic, and noble metallic materials for the formation of the printer tips. The only requirement is that they be hard conductive materials having a melting temperature greater than the melting temperature of the underlying magnetic steel.

As a further improvement the cemented tungsten carbide tips can be plated or coated with a conductive metal prior to being fused. This improves the consistency of the process and helps to accommodate any inconsistencies in the matrix or surface of the cemented tungsten carbide tips.

A further improvement of this invention is that an electrode milling or electrode removal of material can be utilized which significantly shapes the tip to provide for an improved configuration. This improved configuration can be such wherein it centers the tip substantially within the area of the hammerspring while providing shoulders for the decrease of ink migration.

The foregoing improvements over the art will be seen in greater detail hereinafter as set forth in the specification.

SUMMARY OF THE INVENTION

In summation, this invention is an improved printer tip for a hammerspring that is released for impact against a ribbon with an underlying media and a process for manufacturing the printer tip with improved brazing and conformation of the printer tip through an electrode milling process.

More specifically, this invention utilizes a printer tip of cemented tungsten carbide or other hard materials. The printer tip of cemented tungsten carbide is connected to a magnetic spring steel hammerspring by a brazing or fusion process whereby the underlying spring steel is softened or melted to the extent where it receives the printer tip without significant deformation of the printer tip itself. The printer tip retains its integrity as to its relative amount of cobalt in the cemented tungsten carbide. The brazing or fusion of the printer tip to the hammerspring steel is effected by a controlled current between two electrodes, one being on the printer tip and the other on the underlying hammerspring.

The brazing process allows the printer tip to sink slightly into the matrix of the hammerspring. This effects a brazing process or fusion without deformation, or degeneration of the cemented tungsten carbide matrix. Because of the variable constituents of the cemented tungsten carbide matrix, it is possible that an insignificant amount of cobalt could melt without causing deformation or degeneration of the printer tip.

In order to improve the consistency of the fusion process and provide for any inconsistencies in the cemented tungsten carbide, the printer tips can be coated or plated with a conductive metal prior to fusion. The coating of such metals as nickel, nickel alloys, nickel cobalt, cobalt alloys, cobalt, noble metal alloys, noble alloys, copper, silver, silver alloys, chrome, chrome alloys and tin coatings provide for a consistent flow of current, accommodation of variations in the surface or matrix of the cemented tungsten carbide and differences of constituent and surface cemented tungsten carbide content.

Another improved portion of this invention is that the configuration of the tip is maintained with significant integrity which can then be formed by an electrode milling process. The electrode milling process allows for a controlled removal of the material on the tip in order to provide for a well configured tip. The tip can be provided with shoulders which help to diminish ink migration and ribbon wear while at the same time providing for an improved striking tip.

Finally, the brazing or fusion process provides for defining a proper temperature range for the brazing and later shaping of the printer tip without degenerating the overall brazed combination of the tip and underlying spring steel.

DESCRIPTION OF THE PREFERRED EMBODIMENTS

Figure 1:
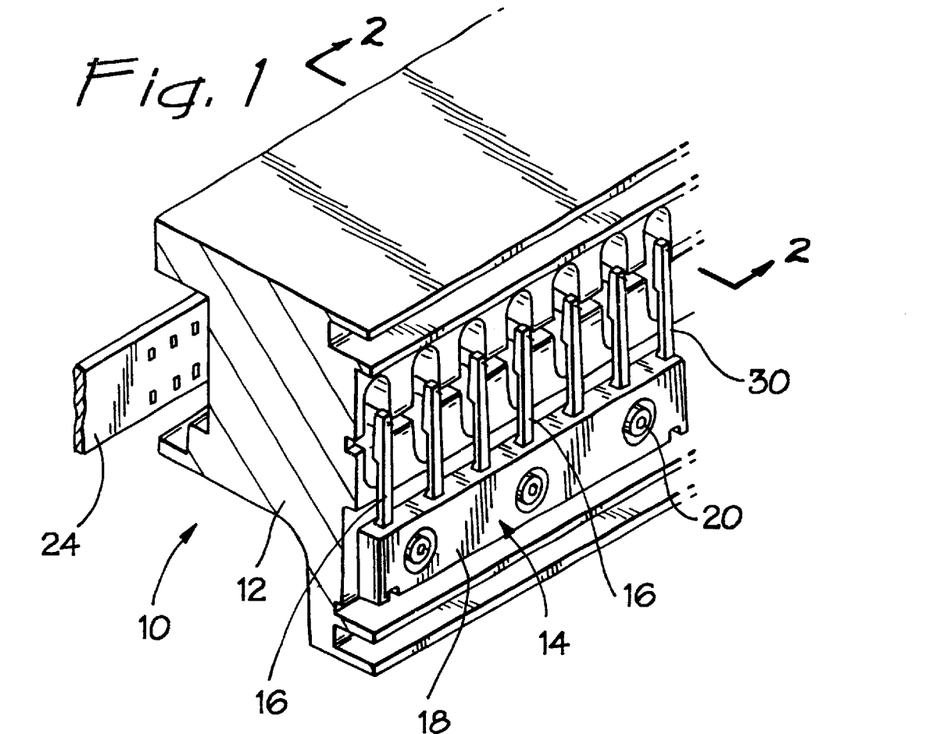
FIG. 1 is a perspective view of a printer hammerbank that has been fragmented and shown with a plurality of hammers.
Figure 2:
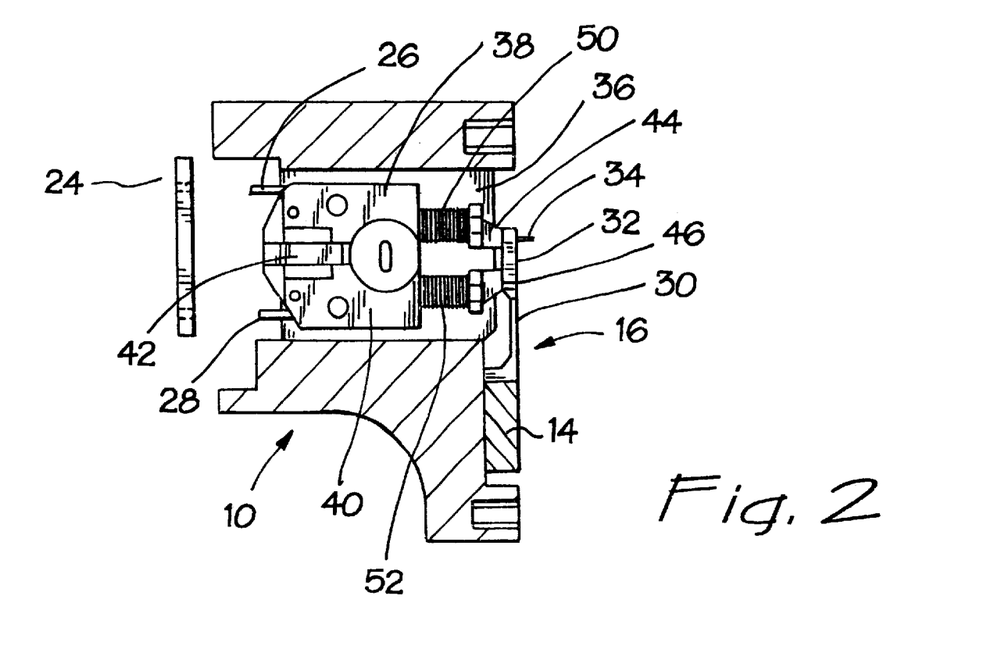
FIG. 2 is a sectional view of the hammerbank as sectioned along lines 2—2 of FIG. 1.

Looking more particularly at FIGS. 1 and 2 it can be seen that a fragmented portion of a hammerbank 10 has been shown. The fragmented portion of the hammerbank includes a hammerbank body 12 having a fret 14 mounted thereto comprising hammersprings 16 attached to and formed with a base portion 18. The base portion 18 has been attached to the hammerbank body 12 by means of screws 20 or other fasteners. The hammerbank 10 includes a circuit board 24 connected to pins 26 and 28 shown in FIG. 2.

The hammersprings 16 can be seen in the sectioned view of FIG. 2 having a major base portion of the fret 14 formed into a necked down hammerspring section 30. The necked down hammerspring section 30 terminates in an enlarged end portion 32 with a print tip 34 connected thereto.

The print tip 34 is brazed or fused to the hammerspring body 16. The enlarged end portion 32 is such where it has sufficient mass to absorb thermal changes as a heat sink during the brazing process as detailed hereinafter.

The hammerbank 10 has cavities as can be seen in the form of cavity 36. The cavity 36 receives a pair of pole pieces 38 and 40 that are potted into place with their attendant operating elements. The pole pieces 38 and 40 have a permanent magnet 42 therebetween. The magnet 42 retains the enlarged pot ion of the hammerspring 32 against pole piece tips 44 and 46.

The pole pieces 38 and 40 have coils 50 and 52 wrapped around them. These coils 50 and 52 when driven by the control circuit board 24 allow a release of the hammerspring 16 from its retained position against tips of the pole piece 44 and 46 by overcoming the permanent magnetism of permanent magnet 42.

One of the major problems of the prior art is that the rapid and constant firing of the hammersprings 16 is such wherein wear on the tips 34 can take place over an extended period of time. Consequently, it has been customary to make the tips 34 out of a hardened material such as cemented tungsten carbide.

In order to attach the cemented tungsten carbide to the hammerspring 16 it has been customary in the prior art to resistance weld the materials and allow the cobalt constituent to fundamentally fuse with the underlying spring steel of the hammerspring. In doing this, if conditions are not correct, the prior art fillet as shown in FIG. 3 namely fillet 72 is not formed in the smooth configured manner as indicated. This is due to the fact that a significant amount of heat of fusion is such wherein it affects the region bounded by lines 74 of the tip and 76 of the hammerspring. Thus, an area of stress and overall failure, or fracture can take place in or near the fillet 72 and at line 76 if it is not properly formed.

The requirements for proper formation rely upon consistent material of the cemented tungsten carbide with significantly consistent matrixes that are utilized in the tip material as well as uniformity of the hammerspring 16 spring steel.

Looking more particularly at the prior art showing of FIG. 4, an exaggerated view can be seen of the print tip 34 which has a number of stress risers and a very poorly formed fillet 72. These inconsistencies are shown as deformation areas D. This type of a fillet 72 as can be seen is subject to failure and was a problem of the prior art if control was not maintained.

Figure 5:
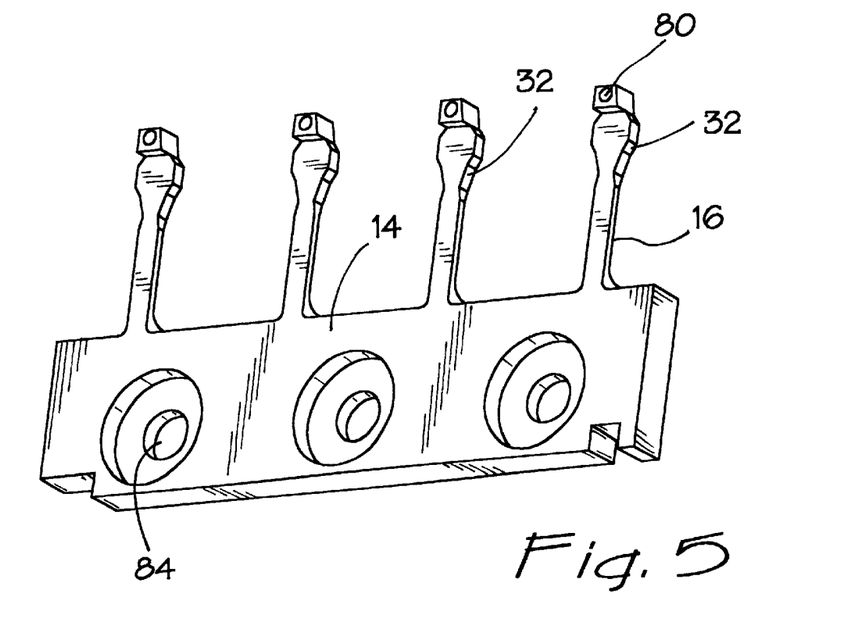
FIG. 5 shows a perspective view of a fret with a plurality of hammersprings thereon with a ball or sphere of cemented tungsten carbide brazed thereto.
Figure 6:
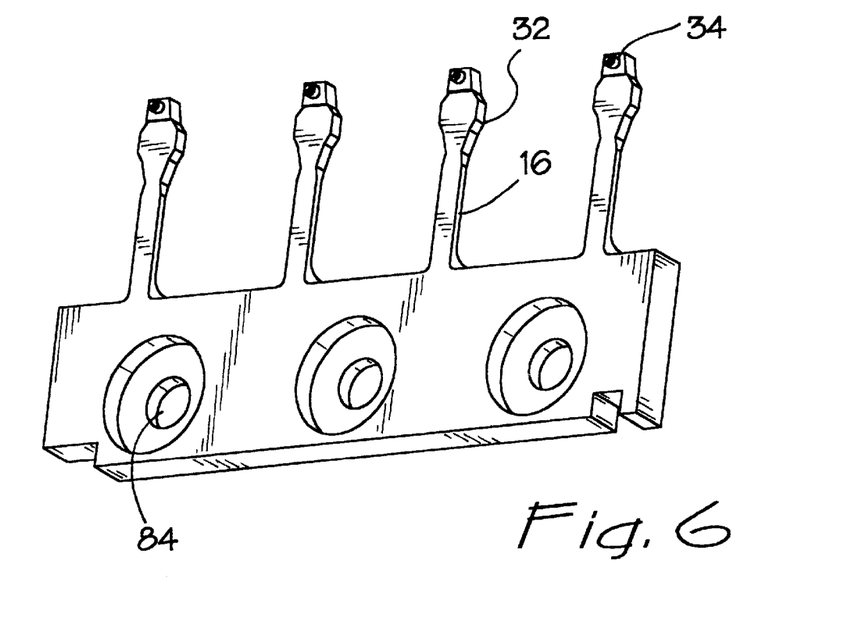
FIG. 6 shows a view of the fret and hammerspring of FIG. 5 after the ball has been electrode milled to a desired configuration.

Looking more particularly at FIGS. 5 and 6, the improved hammerspring 16 and tips 34 of this invention can be seen in greater detail. In FIG. 5 it can be seen where a sphere 80 has been fused or brazed to the enlarged head 32 of a hammerspring 16 formed as a fret 14 on the base 18. The fret 14, of course, can be attached to the hammerbank 10 by the screw holes 84.

After the spheres 80 have been brazed or fused to the underlying hammerspring 16, they are then formed as shown in FIG. 6. This formation provides for a printer tip 34 having a shoulder which will be detailed hereinafter and a smaller portion extending therefrom for print ribbon contact. The formation is by the electrode milling process detailed in FIG. 12 as expanded upon hereinafter.

Figure 7:
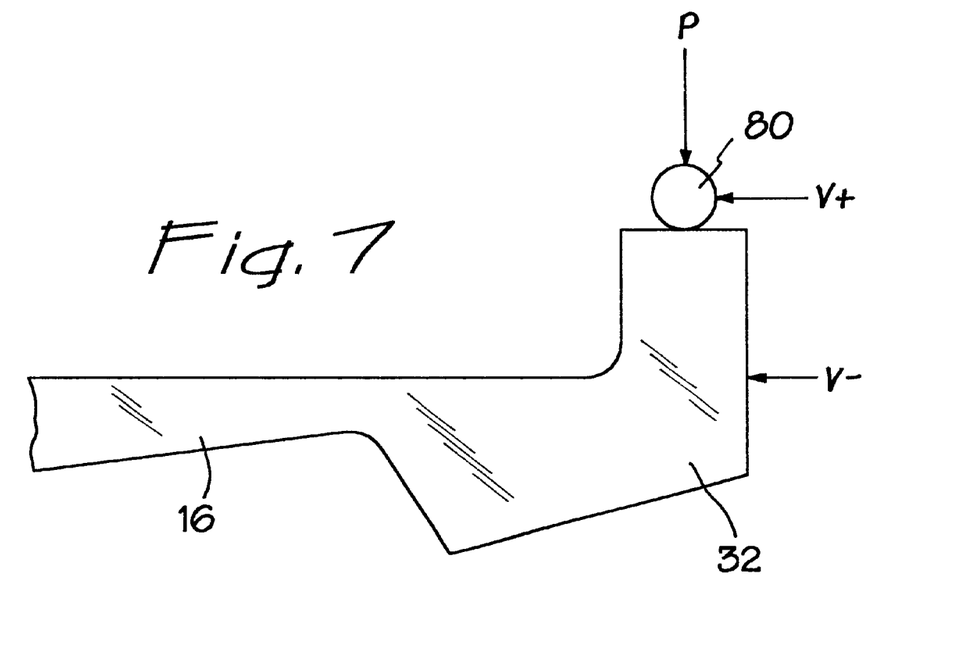
FIG. 7 shows a fragmented side elevation view of a sphere of cemented tungsten carbide in preparation for fusing to an underlying hammerspring.
Figure 8:
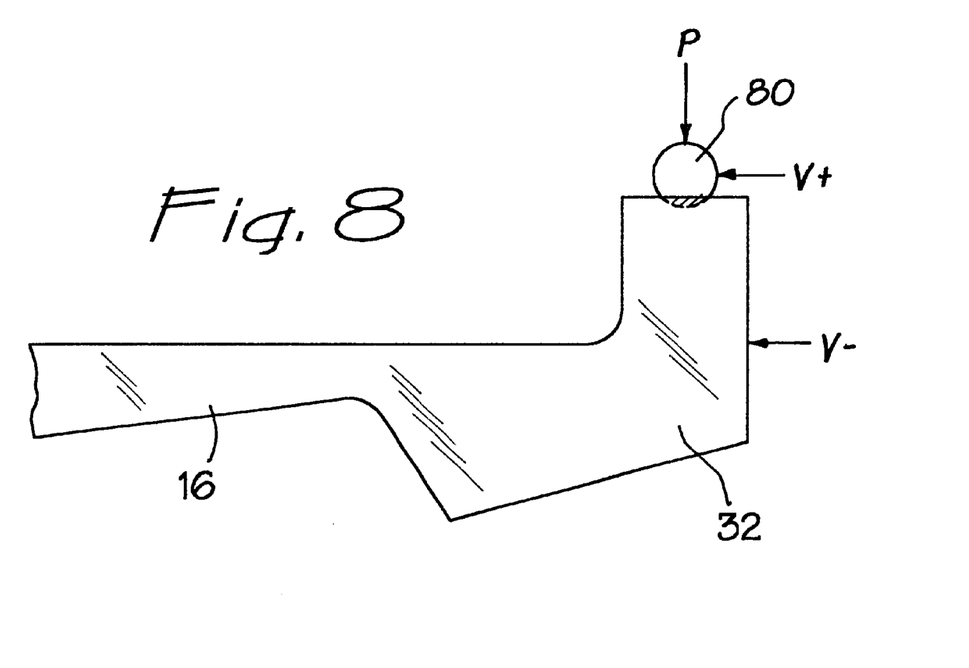
FIG. 8 shows a view similar to FIG. 7 after the sphere of cemented tungsten carbide has been fused or brazed to the underlying hammerspring.

Looking more specifically at FIGS. 7 and 8, it can be seen wherein a sphere such as sphere 80 has been emplaced on top of a hammerspring 16 for connecting it to the enlarged portion 32 of the hammerspring. The sphere 80 is configured and made of cemented tungsten carbide having the constituent ranges as set forth. The sphere 80 can be substituted by other solid shapes such as a cylinder, a cuboid, or a pyramid. Such shapes can be utilized for a print tip conformed or configured in the desired shape prior to brazing, with or without electrode milling thereafter. In other words a specified shape can be brazed to the hammerspring 16 and utilized as a tip 34 in such a shape if modified thereafter by electrode milling.

The sphere 80 in this particular case is impressed by a pressure P against the underlying hammerspring 16 spring steel at the enlarged section 32. The pressure P in this particular case can be anywhere from 0.5 pounds to 5 pounds. Preferably, the speed is constant. Upon contact of the tip 80 to the spring steel 32, a voltage V+ is supplied to the sphere 80 and V− applied to the enlarged portion of the hammerspring 32. Excellent results have been obtained using a current in the range of 150 Amp to 350 Amp for 10–200 milliseconds. To bring the heat during the fusion cycle to a first temperature $T_1$, the condition of the electrodes, the tip, and the magnetic steel surfaces are then determined. A transformer intelligent circuit then decides the amount of power to be applied to produce heat during the fusion cycle sufficient to increase the temperature from $T_1$ to $T_2$.

During this second phase current is applied from a range of 300 Amp to 800 Amp for 30–400 milliseconds. Finally, the cooling phase lasts from 0–200 milliseconds. These voltages allow for a current to flow of sufficient strength to braze or fuse the sphere 80 into the underlying spring steel of the enlarged portion 32.

The temperature is controlled so as to limit any deformation of the sphere 80 while relying substantially upon the deformation, softening or melting of the underlying spring steel of the hammerspring enlarged portion 32.

Figure 9:
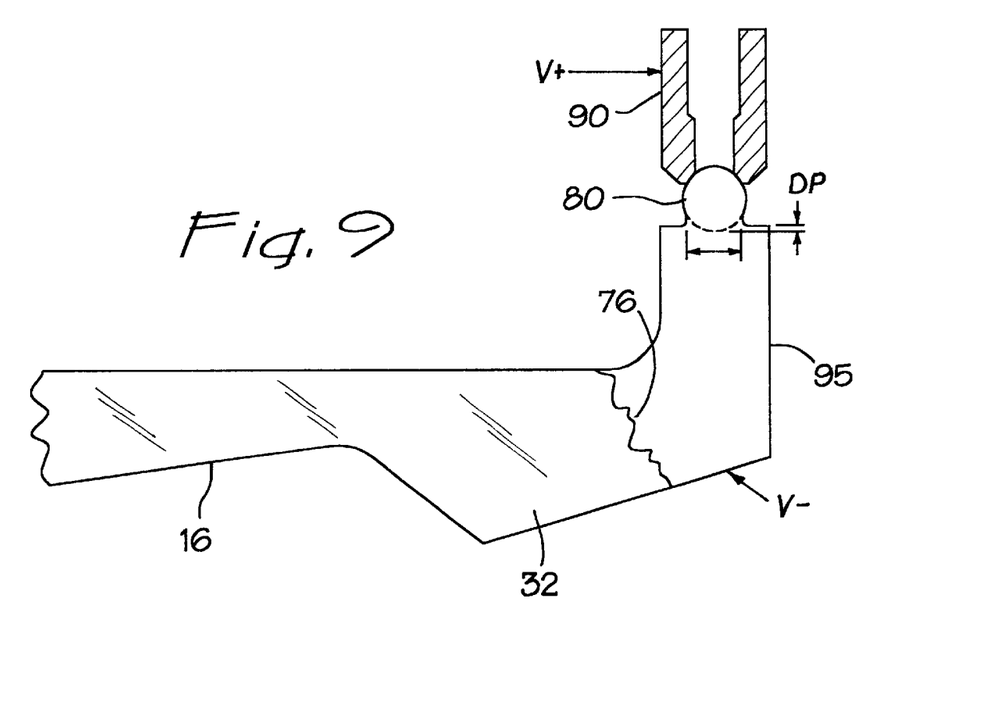
FIG. 9 shows a side elevation view of a sectioned electrode on the cemented tungsten carbide sphere for brazing the sphere to the underlying hammerspring.
Figure 10:
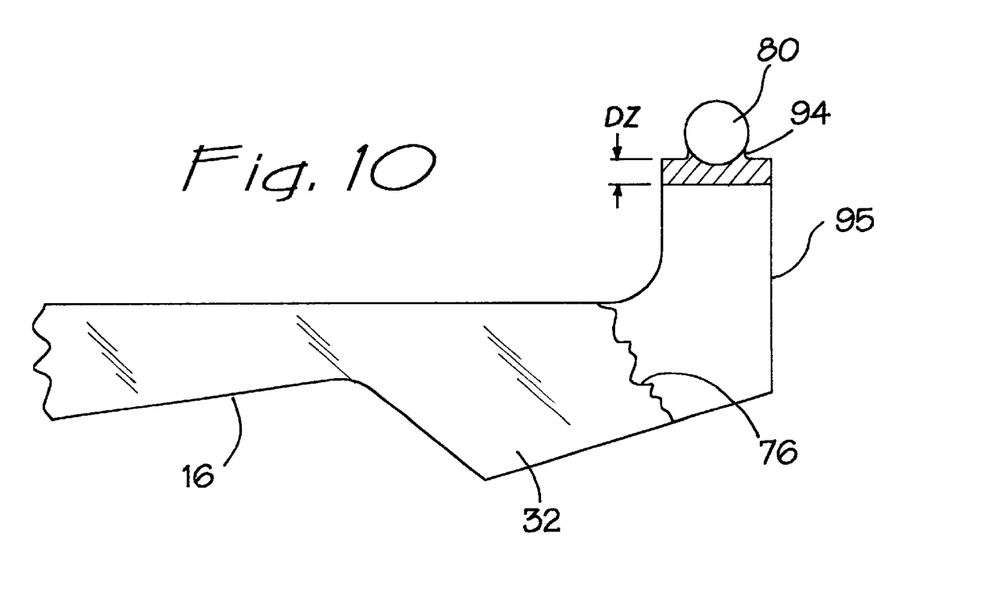
FIG. 10 shows the sphere after it has been fused to the underlying hammerspring.

The foregoing process is seen more particularly in FIGS. 9 and 10 wherein electrode 90 formed with a circumferential configuration is pressed thereover and holds the sphere 80. Upon contact the passage of current melts the zone 94 of enlarged portion 32. In this particular manner, the sphere 80 sinks into a depth in the enlarged portion 32 as indicated by the arrows namely depth DP. The depth DP varies with regard to the pressure applied to the sphere 80 as well as the overall current that creates a brazing, and the circumference of the sphere. Larger circumference spheres sink into the steel of the hammerspring less than smaller ones given equal energy and like constituent materials.

The electrodes with the respective voltages V+ and V− be applied to a different locale from that shown in the prior FIGS. 7 and 8. The criteria is that one must be connected to the sphere 80 or other configured tip, while the other electrode must be connected to the hammerspring 16.

The sphere 80 or other configured tip can be plated or coated with a conductive coating. This can be done by an electroless coating process or any other process known as barrel plating and related coatings. By plating the sphere 80 or other configured tip it helps to remove impurities from the surface. It also helps to clean the surface to accept the coating.

The coating helps to increase the conductivity of the cemented tungsten carbide during the fusion process. It also increases the consistency as to any impurities so as to not adversely affect the electrode. It should be born in mind that electrodes are subject to wear and when impurities are encountered, they tend to build up on the surfaces or degrade the electrode. To this extent, the coating or plating also improves the operation of the electrode.

In order to effectively provide for a coating or plating of the cemented tungsten carbide prior to fusion, a coating of nickel, nickel alloys, nickel cobalt, cobalt alloys, cobalt, noble metal alloys, noble alloys, copper, silver, silver alloys, chrome, chrome alloys and tin coatings, or other metals selected from the group which allows for conductivity and diminished effects of oxidation are utilized. Further to this extent, the coatings or platings on the cemented tungsten carbide should not react with tungsten carbide, degrade it, such as by leaching it or causing the matrix or the surface to deteriorate to any significant degree.

The brazing should also be conducted in a protective atmosphere such as Argon or other inert gas or in a vacuum to prevent oxidation.

Looking more particularly at FIG. 10, it can be seen wherein the sphere 80 has been impressed into a zone DZ. The zone DZ within the enlarged portion 32 of hammerspring 16 can be seen as a slightly deformed area with fillet 94 rising up to surround the base of the sphere 80 from the spring steel material from the zone DZ. This provides a fused fillet 94 and brazing without deforming or degenerating the nature of the cemented tungsten carbide in its matrix of the sphere 80.

The print hammer 16 can be of an alloy steel, generic carbon steel or magnetic steel, for example a 9310 steel. Electro milling after brazing forms the new shape into a tip size in the range of from about 3–40 mils or larger in various geometric solid configurations if desired. For larger tips, larger size balls and other geometric solid configurations can be used. Prior art tip size is about 12 mils.

In the prior art process the cemented tungsten carbide tip contains typically 16% Co and 84% WC. With the novel process of this invention the printer tips have been made with cemented tungsten carbide, for example, on a weight percentage of 10% Co and 90% WC; 6% Co and 94% WC; 3.3% Co and 96.7% WC; and, 2.5% Co and 97.5% WC. These ranges produce extremely hard, long wearing printer tips.

The brazing temperature is preferably about 1400° C. In any event it should be less than the melting temperature of cobalt or other material alloyed with cemented tungsten to prevent the cemented tungsten carbide from going to the liquid state or melt phase, which would cause material deformation or thermal shock.

Printer tips made according to the process of this invention have shown tip wear reductions of 33% compared to prior art tips made of 84% WC, 14% Co and Cr. Moreover, the process is faster and less expensive than the prior art process.

During the brazing and fusing process of this invention, the head portion 95 of the enlarged portion 32, of the hammerspring 16 acts as a heat sink for the hammerspring. At the same time, the upper electrode 90 and the Argon or other protective gas act as a heat sink for the tip 80 material and protect the tip 80 from oxidation.

ELECTRO DISCHARGE MACHINING

Looking more particularly at FIG. 11, it can be seen wherein the hammerspring 16 with the enlarged portion 32 has a dotted configuration showing the printer tip that is to be evolved through electrode milling or electro discharge machining as hereinafter set forth. The sphere 80 is formed in such a manner such that removal of material therefrom and from the enlarged portion namely material 96 through electrode milling is accomplished. An upright portion of the tip 98 remains as part of the enlarged base 32 of the hammerspring 16. The electrode milling can be such as to provide enlarged fillets 100 that enhance the overall strength and configuration of the shank 98 of the printer tip.

Additionally, the electrode milling can provide shoulders 102 or 144 to the tip. These shoulders 102 and 144 tend to prevent ink migration by retaining the ink and allowing it to be wiped during the printing process.

Figure 11:
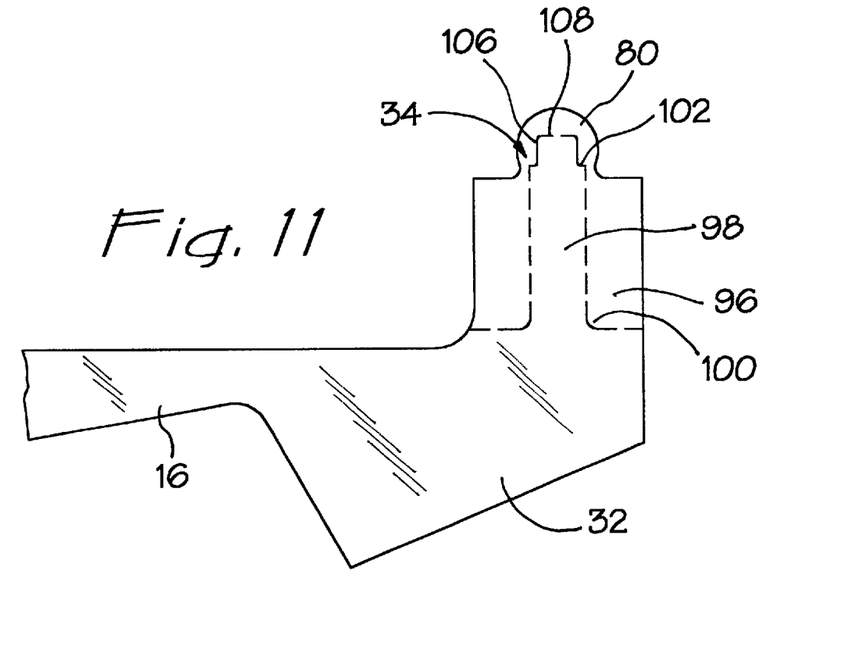
FIG. 11 shows a dotted in proposed shape of the printer tip that is to be formed by an electrode discharge milling process.

In addition to the electrode milling or electro discharge machining to form the general configuration as shown in FIG. 11, the electrode milling can provide a chamfer 106 around the top edge of the tip 34. The tip 34 can be of a flattened configuration having a flat top or striking surface 108 which is used for printing or be of any other suitable configuration such as a rounded, convex or concave shape depending upon desirability for the printing process.

The showing in FIG. 11 particularly shows an offset sphere 80 which has been corrected for its offset location by the electrode milling process. This is performed by forming the printer tip shank 98 in a central location yet at the same time utilizing the cemented tungsten carbide of the sphere 80 even though it has been offset.

Figure 12:
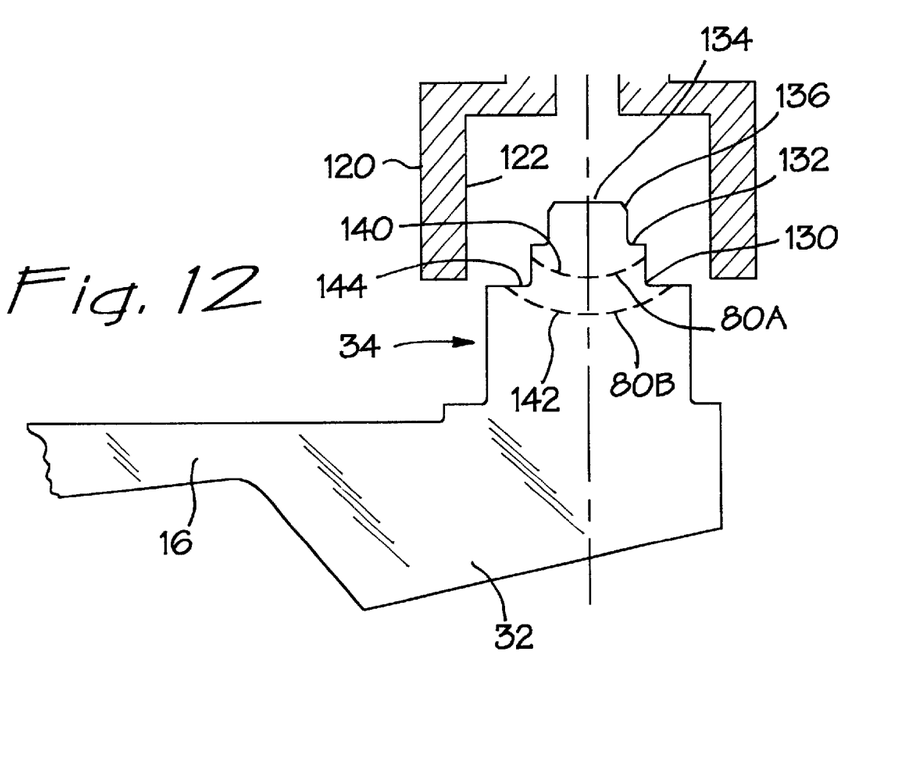
FIG. 12 shows an electrode discharge orientation for the electrode overlying the hammerspring and tip that has been formed by the electrode milling process.

Looking more particularly at FIG. 12, it can be seen wherein a printer tip 34 has been formed in the manner shown in FIG. 11. Specifically, the hammerspring 16 with the enlarged portion 32 has been placed in an electrode milling process with an electrode 120 overlying the tip 34. The electrode with its sidewalls 122 discharge an arc and mill the edges of the tip 34 so that a first fillet 130 can be provided with a shoulder 132. The tip 34 terminates in a flattened surface 134 having a chamfer 136 similar to chamfer 106.

This particular tip 34 configuration is such wherein the net result is a printer tip evolved from the sphere 80 that has been shown in a dotted configuration as it would be configured on the enlarged base portion 32 in two locations as shown by dotted lines 140 and 142. The dotted lines 140 and 142 show the position of a sphere in relation to its brazing or fusion process prior to electrode milling. Of course, one skilled in the art will be able to vary the size of the sphere 80 in the form of the outlined configuration 140 which is sphere 80A and the configuration as shown in dotted line 142 as sphere 80B. These various spheres can be oriented in any suitable manner to provide for sufficient depth into the hammerspring enlarged portion 32 as indicated in the depth DP required shown in FIGS. 9 and 10 or for any other suitable orientation as known in the art.

As can be seen from the foregoing description of the apparatus and the process, the fusion process or brazing can attach any metal or conductive material to the hammerspring 16. The process is such wherein the magnetic steel of the hammerspring 16 and in particular the enlarged portion 32 fuses around the sphere 80 or any other configuration that can be shaped into a printer tip. Inasmuch as the resistance fusion process does not go through any deformation or thermal shock to the tip material, a substantially integral configuration of the tip 34 is maintained as to its character. This also allows a selection from a family of materials such as sintered tungsten carbide, composite ceramics, metallic materials and noble metals.

The sphere 80 or other configurations as an alternative can also be substituted by such materials as zirconium, boride, titanium nitride, zirconium carbide, alumina, beryllium carbide, titanium carbide, silicon carbide, aluminum boride, boron carbide, as well as alloys and mixtures thereof. The foregoing constituent materials including composite ceramics, when utilizing the prior plating process set forth hereinbefore on page 17 allows for the fusion of such tips into spring steel for improved tip life. Thus, it can be seen with the plating process and with the other tips, that this invention is a significant step over the art insofar as providing for variations in tip content and hardness of tip materials.

The cemented tungsten carbide of the sphere 80 or other geometric tip configuration in the form of a cemented carbide can be upwards of 97.5% tungsten with 2.5% binders such as cobalt. With these high concentrations of tungsten carbide, the tip wear can be reduced inasmuch as the cemented tungsten carbide is harder than the cobalt and chrome. Also, the method of fusing the cemented tungsten carbide is more rapid.

As previously set forth, the high stress areas that are normally prone to fracture or disintegrate are formed of a magnetic steel which serves to diminish the fatigue. Please also note that the zone affected by the heat is very minimal. The effects of the heat are limited to approximately the area DZ of FIG. 10. This is based upon the upper electrode 90 having a particular voltage V+. The bottom electrode V− conductive with the magnetic steel can be attached in any suitable location so long as sufficient power can be delivered from the upper electrode 90 with the enlarged portion 32 acting as a heat sink. In order to enhance the fusion process argon gas or other inert gas can be utilized around the sphere 80 to protect the tip from oxidation. This also helps to provide a heat sink.

The sphere 80, or any other suitable configuration such as a cuboid, tetrahedron, pyramid or cylinder can be controlled as to its depth DP shown in FIG. 9 by the amount of weight or pressure on the upper electrode 90. This as previously stated can range from 0.5 pounds to 5 pounds or in greater or lesser amounts depending on the overall PSI ratios and the material and voltages being used.

The transformer which generates the current for the brazing process is a high frequency transformer connected to the upper electrode with a + voltage. However, the voltage orientation can be reversed.

The current through the upper and lower electrodes can range from approximately 150 Amps to 350 Amps for a duration from 10 to 200 milliseconds which produces the heat necessary for the fusion.

A second wave of energy can help to increase the temperature if applied from 2 to 200 milliseconds for a particular desired upper temperature by applying additional current in the range of 300 Amps to 800 Amps and holding it for a period of 30 milliseconds to 400 milliseconds. Further to this extent, a post heat normalization can be utilized for normalizing the effects of the fusion and brazing upon the metal of the hammerspring 16 and sphere 80.

After the foregoing brazing or fusion process is accomplished, the electrode discharging milling or machining takes place as generally shown in the schematic view of FIG. 12. The electrode discharge machining or milling can enable tip sizes to be formed of significantly finite configurations and sizes as well as providing a concentric tip to the hammerspring. This is shown in FIG. 11 by the fact that even an offset relationship can be accounted for by the electrode discharge milling operation. The sphere 80 as seen in FIG. 11 although offset is compensated for by the electrode discharging process of milling and machining. Further to this extent, the process hereof provides for shoulders which can allow for ink to be retained thereon to prevent ink migration.

The electrode discharge machining process is such wherein the electrode 120 is made of graphite, impregnated with copper. The machining process produces arcs when the graphite electrode is close to the hammerspring. The hammerspring takes on a plus charge and the electrode carries a negative charge.

The whole process occurs under a protective environment by using a dielectric oil well known in the art. During the electrode discharge and milling process, the tip is protected from oxidation by the foregoing dielectric oil. The whole process occurs in two phases wherein the first phase removes the heavy material from the tip. In a second phase only a limited amount of material is removed to produce a final shape with surface finishes.

With the foregoing in mind, it should be understood that the sphere 80 or cuboid or other alternative configuration when brazed or fused to the underlying enlarged hammerspring portion 32 does not go into a melted or liquid phase. The melt stage or softening is in the enlarged print hammer portion 32. However, in order to avoid deformation or re-characterizing of the metallurgy of the print hammerspring, hammerspring, or printer hammerspring 16, the melt stage never extends into the high stress area or the necked down portion 30 as defined somewhat by the line 76 of FIGS. 9 and 10.

After the tips 34 are milled to the right size, a fluorocarbon or other coating such as a silicone which can be hydrophilic and hydrophobic can be applied to the printer tips 34. This helps to limit ink migration for improved performance.

Also, the tips after formation by the milling process as well as the hammerspring areas can be plated or coated with a wear resistant and oxidation resistant coating such as a chrome alloy, nickel, noble metal or similar material.

As can be seen from the foregoing, this invention is a significant step over the art and should be accorded broad coverage.

What is claimed is:

1. A method of forming a tip for a print hammer comprising:

providing a steel print hammer;

electrically softening the steel of said print hammer;

impressing a cemented tungsten carbide member into a portion of said print hammer; and, fusing said cemented tungsten carbide member into the steel print hammer without substantially deforming said cemented tungsten carbide member.

2. The method as claimed in claim 1 wherein:

said cemented tungsten carbide member is a sphere.

3. The method as claimed in claim 1 wherein:

said cemented tungsten carbide member is selected from the group of configurations consisting of a cuboid, tetrahedron, pyramid, or cylinder.

4. The method as claimed in claim 1 wherein:

said cemented tungsten carbide member constituents have a range of cobalt by weight from 2½% to 12%.

5. The method as claimed in claim 1 further comprising:

maintaining a substantially inert gas around said hammer and said cemented tungsten carbide member during electrical fusing; and, impressing said cemented tungsten carbide member with pressure of 0.3 pounds per square inch to 7 pounds per square inch.

6. The method as claimed in claim 1 further comprising:

forming a printer tip of a desired configuration after fusing by electro-discharge milling.

7. The method as claimed in claim 6 further comprising:

forming a fillet below the end of said tip and a shoulder.

8. The method as claimed in claim 1 further comprising:

electrically fusing said cemented tungsten carbide member in two stages with two different amperage ranges.

9. A method of forming a printer tip on a metal printer hammer spring comprising:

providing a printer tip from a range of materials from the group consisting of sintered tungsten carbide, cemented tungsten carbide, composite ceramics, metallic materials, noble metals, metal carbides, borides, nitrides and alloys and mixtures thereof;

pressing said printer tip against a printer hammerspring;

electrically softening said printer hammerspring through a voltage established by an electrode contacting said printer tip;

pressing said printer tip into a surface of said hammerspring without substantially deforming said printer tip;

fusing said hammerspring to said printer tip; and, milling a desired form to said printer tip and hammerspring by an electrode discharge milling process.

10. The method as claimed in claim 9 further comprising:

providing an inert gas around said printer tip and a portion of said hammerspring in proximity to said printer tip during said electrically softening and fusing process.

11. The method as claimed in claim 10 wherein:

said printer tip is made of cemented tungsten carbide with a range of cobalt from 2½% to 12%.

12. The method as claimed in claim 11 wherein:

said softening is performed by a current of 150 amps to 350 amps for a period of 10 to 200 milliseconds; and, said fusion is performed by a current of 300 amps to 800 amps for 30 to 400 milliseconds.

13. The method as claimed in claim 9 further comprising:

plating or coating said printer tip prior to fusing said printer tip to said hammerspring.

14. A method for forming a printer hammerspring with a printer tip comprising:

providing a steel hammerspring;

providing a cemented tungsten carbide sphere with a range of cobalt from 2½% to 12%;

impressing said cemented tungsten carbide sphere against said hammerspring while fusing said sphere to said hammerspring through a softening of the steel of said hammerspring; placing said tungsten carbide sphere into a portion of a surface of said hammerspring; and, electrically discharge milling said sphere to a desired printer tip shape.

15. The method as claimed in claim 14 further comprising:

providing an inert gas during said fusion.

16. The method as claimed in claim 15 further comprising:

electrically discharge milling a fillet and a shoulder below the end of said tip.

17. A method of forming a print hammerspring with a printer tip comprising:

provinding a printer tip made of cemented tungsten carbide;

providing a printer hammerspring;

electrically fusing said printer tip to said printer hammerspring by maintaining the temperature of said printer hammerspring below the melting temperature of said printer tip; and embedding said printer tip at least partially into a surface of said printer hammerspring without substantially deforming said printer tip.

18. The method as claimed in claim 17 further comprising:

discharge milling said printer hammerspring and printer tip to a desired shape through an electro-discharge milling process in a dielectric medium.

19. The method as claimed in claim 17 wherein:

said printer tip is formed from cemented tungsten carbide with cobalt in the amount of 2½% to 12% by weight.

20. The method as claimed in claim 17 further comprising:

electrically fusing said printer tip in a two step process at two different temperature ranges into said printer hammerspring.

21. A method of forming a printer tip to a steel print hammer comprising:

providing a printer tip of cemented tungsten carbide in the range of 2% to 12% cobalt;

disposing an electrically conductive metallic surface on said printer tip;

fusing and impressing said printer tip into and below a portion of a surface of the steel of said print hammer at a temperature below the melting temperature of the cemented tungsten carbide of said printer tip; and, electrode discharge milling said printer tip to a desired shape.

22. The method as claimed in claim 21 further comprising:

impressing said printer tip against said print hammer while fusing it to said print hammer.

* * * * *